April 1, 1924.
F. KNILL
FISH LURE
Filed Sept. 28, 1922
1,489,035
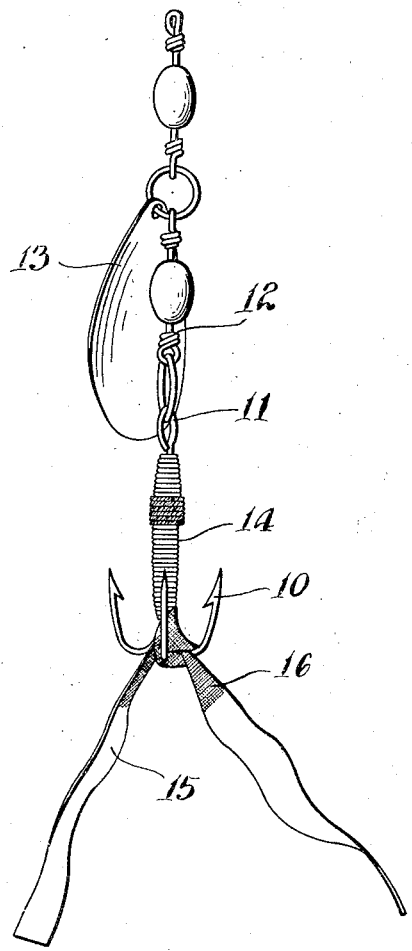
INVENTOR
Frank Knill,
By Baker Moeklin,
ATTYS Patented Apr. 1, 1924.

1,489,035

UNITED STATES PATENT OFFICE.

FRANK KNILL, OF VERMILION, OHIO.

FISH LURE.

Application filed September 28, 1922. Serial No. 591,183.

*To all whom it may concern:*

Be it known that I, FRANK KNILL, a citizen of the United States, residing at Vermilion, in the county of Erie and State of Ohio, have invented certain new and useful Improvements in Fish Lures, of which the following is a full, clear, and exact description, reference being had to the accompanying drawings.

This invention relates to improvements in a fish lure, particularly the type of lure illustrated in my co-pending application, Serial No. 497,883, filed September 2nd, 1921. Briefly, the lure in my copending application embodies a set of hooks mounted on a chain with windings of different color on the hook shanks to represent a grub.

The improvement contemplated is in the nature of an attachment to hooks, such as shown in my co-pending application, for making an additional attraction as the bait is moved through the water. My invention also includes the method of making this improvement, as will be hereinafter set forth in the following description in the accompanying drawing, and subsequently summarized in the claim.

In the drawing, I have shown a fish bait embodying my invention.

My invention is shown attached to a set of hooks 10 which are arranged to be secured, as at 11, to a flexible chain, indicated generally at 12. A suitable spinner 13 is shown attached to a chain, but, if desired, additional spinners may be provided by adding the necessary chain links. The hooks are preferably three in number and the shanks thereof are shown as covered with many turns of cord over the linen thread 14, representing a grub.

To provide an added attraction or lure, I have shown streamers, indicated generally at 15, which are attached to the hooks and so formed that the ends of the streamers flutter as the bait is moved through the water. Moreover, the streamers are so formed that they remain out of contact while in the water, thereby insuring a continuous independent motion while the bait is in use.

In making the streamers, I prefer to employ a single strip of white cotton braid which is tied intermediately to the hooks in such manner that the ends thereof diverge and extend rearwardly. Then the portion of the braid adjacent the hook is colored, as by immersion in red ink, indicated at 16. The coloring matter is then protected by a subsequent immersion in shellac and after this is dried, an additional immersion in lacquer provides a stiff water-proof coating, and at the same time aids materially in holding the streamers in diverging position. The rest of the braid being untreated, is free to flutter as the bait is drawn through the water.

An advantage of a bait constructed according to my invention, is the cheapness of construction and the attainment of the desired fluttering motion by reason of the fact that the streamers are partially stiffened adjacent the point of attachment to the hooks.

I claim:—

In combination, a fish hook, a strip of narrow braid tied intermediately to the hook with the ends thereof diverging, and means for stiffening the braid adjacent the hook, whereby the streamers are held in diverging position, and whereby only part of the streamers are permitted to flutter while the bait is moving through the water.

In testimony whereof, I hereunto affix my signature.

FRANK KNILL.